United States Patent [19]

Hogan, Jr. et al.

[11] 4,443,816
[45] Apr. 17, 1984

[54] DIGITAL VIDEO IMAGE SPLITTER

[75] Inventors: Robert D. Hogan, Jr.; Narendra T. Sanghvi; Richard F. Morris, all of Indianapolis, Ind.

[73] Assignee: Indianapolis Center for Advanced Research, Inc., Indianapolis, Ind.

[21] Appl. No.: 372,578

[22] Filed: Apr. 28, 1982

[51] Int. Cl.³ .............................................. H04N 7/18
[52] U.S. Cl. ..................................... 358/160; 356/384; 358/107
[58] Field of Search ............... 358/107, 101, 100, 149, 358/160; 356/372, 375, 384; 364/550; 209/939

[56] References Cited
U.S. PATENT DOCUMENTS

| | | | |
|---|---|---|---|
| 3,081,379 | 3/1963 | Lemelson | 358/107 |
| 3,218,389 | 11/1965 | Reed | 358/107 |
| 3,829,609 | 8/1974 | Payne | 358/107 |
| 4,018,990 | 4/1977 | Long | 358/149 |
| 4,065,787 | 12/1977 | Owen | 358/160 |
| 4,099,205 | 7/1978 | Hattori | 358/149 |
| 4,134,131 | 1/1979 | Hopkins | 358/149 |
| 4,287,532 | 9/1981 | Moore | 358/107 |

Primary Examiner—Howard W. Britton
Attorney, Agent, or Firm—Barnes & Thornburg

[57] ABSTRACT

A digital video image splitter permits the top portion of a closed-circuit television (CCTV) display to be shifted right (delayed) or left (advanced) with respect to the stationary bottom portion of the display. The user controls the vertical level (distance from top to bottom of display) at which the split is seen on the display, and the amount of shift from controls in the system. Shifting of the image permits the width of an object displayed on the display to be measured. By matching opposite edges of the object in the display, the width of the displayed object is equal to the amount of shift. A single raster line at the level of the split is available as digitized image intensity data, and represents the intensity profile of the video display, including the object being measured, along that raster line.

20 Claims, 6 Drawing Figures

DIGITAL VIDEO IMAGE SPLITTER

This invention relates to measurement systems, particularly for the measurement of objects, and particularly to measurement instruments of the image-splitting type which use combination microscope/television cameras and closed circuit televisions.

Image-splitting devices for measuring instruments are known. There is, for example, the system described in Payne U.S. Pat. No. 3,829,609.

According to the invention, an image-manipulating apparatus includes first means for receiving an electrical signal representative of an optical image of an object, second means for obtaining from that electrical signal information necessary to synchronize the display of the optical image, third means for operating on the portion of the electrical signal representative of the optical image, fourth means for shifting a desired portion of the thus-conditioned optical image-representative portion of the signal by a desired amount relative to the synchronizing information, fifth means for recombining the optical image-representative portion, including the thus-shifted portion thereof, with the information necessary to synchronize the display, and sixth means for coupling the fifth means to an image display mechanism.

According to an illustrative embodiment, the system further comprises a video camera for generating the electrical signal representative of an optical image of the object. According to other illustrative embodiments, the electrical signal representative of an optical image of an object is provided from a video tape or from a video disk.

According to an illustrative embodiment, the second means includes a line-synchronizing signal separator and a field-synchronizing signal separator.

Additionally, according to an illustrative embodiment of the invention, the third means comprises an analog-to-digital converter.

Further according to an illustrative embodiment, the fourth means comprises means for selectively delaying the desired portion by the desired amount relative to the synchronizing information. Alternatively, the fourth means can comprise means for selectively advancing the desired portion by the desired amount relative to the synchronizing information.

In addition, illustratively, the system comprises means for operating on the optical image-representative portion, including the thus-shifted portion thereof, to condition it for recombination with the information necessary to synchronize the display. This means can include a digital-to-analog converter.

Further, the system may comprise a means for storing the information operated upon by the third means. Additionally, the system can include means for transferring the information operated upon by the third means to an external electronic system or computing device.

The invention may best be understood by referring to the following description and the accompanying drawings which illustrate an embodiment of the invention. In the drawings.

Figure 1:
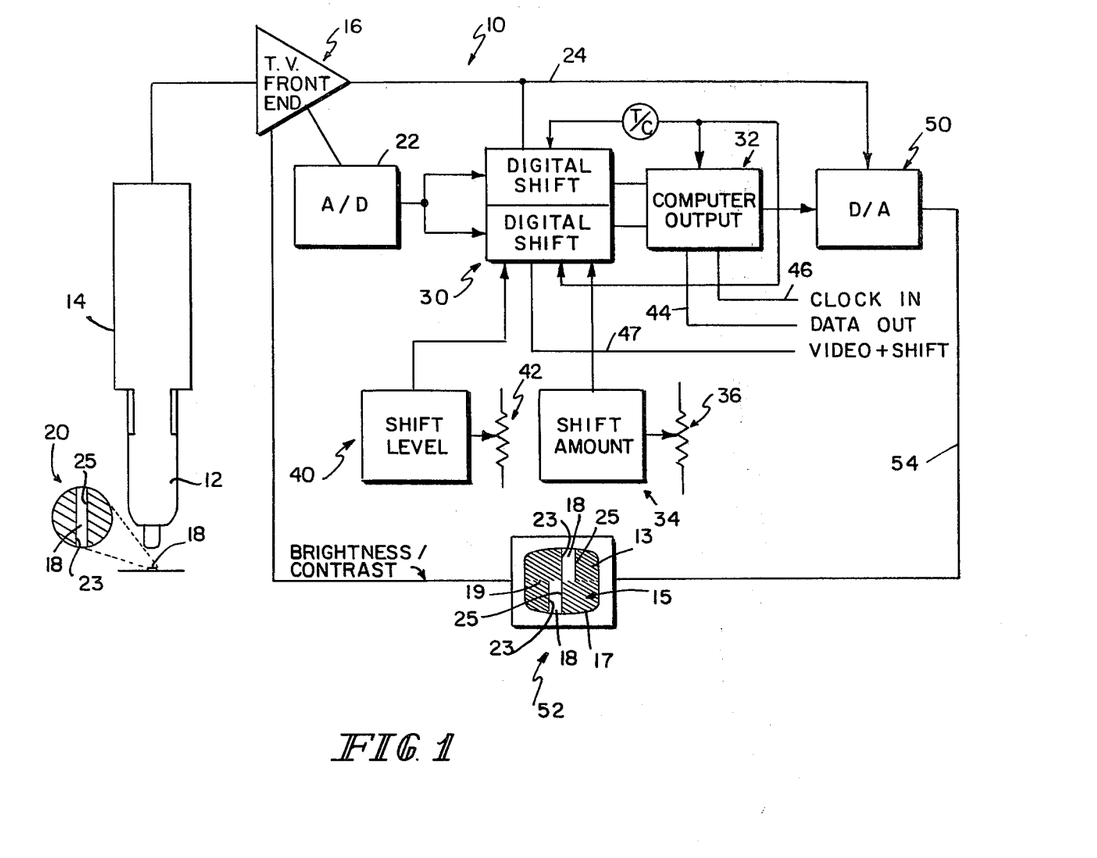
FIG. 1 is a block diagram of a system constructed according to the invention.
Figure 2:
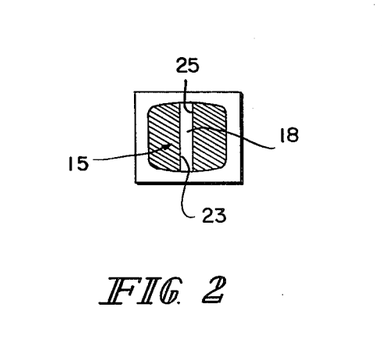
FIG. 2 is an illustration of a display provided by the system of FIG. 1 under certain operating conditions.

A digital video image splitter 10 permits the top portion 13 of a closed-circuit television (CCTV) display 15 to be shifted right (delayed) or left (advanced) with respect to the stationary bottom portion 17 of the display 15. The user controls the vertical level 19 (distance from top to bottom of display) at which the split is seen on the display 15, and the amount of shift from controls in the system. Shifting of the top portion 13 of the displayed image 15 permits the width of an object 18 displayed on the display 15 to be measured. By matching opposite edges 23, 25 of the object 18 in the display 15, the width of the displayed object 18 is equal to the amount of shift. Since the digital video image splitter 10 is digital in nature, a single raster line (horizontal line of the video display), at the level 19 of the split, is available as digitized image intensity data, and represents the intensity profile of the video display 15, including the object 18 being measured, along that raster line. Typical input/output devices for use with this system are any Electronic Industries Association (EIA) RS-170 (National Television Standards Committee/Closed Circuit Television—NTSC/CCTV) input and output devices. For example, input may be from video tape, video camera, or video disk. Similarly, output may be onto video tape, video disk, or any other video recording medium instead of onto a display device such as a CRT. These input and output devices may form permanent library storage for images from which data are, or are to be, collected.

An RS-170 video signal is input to the system 10 illustrated in the drawing. The horizontal and vertical sync signals are detected and appear on a conductor 24, and the video signal is separated from the sync and supplied to an analog-to-digital (A/D) converter 22. The video signal, which at that point is an analog signal, is "digitized" in the A/D, which illustratively has a band width of 10 MHz. The digitized signal is digitized into, for example, 512 picture cells (pixels) per horizontal data line, with each pixel comprising a six-bit binary word. These data from the horizontal lines are then stored in a 512-by-6 static random access memory (RAM). When the next horizontal sync pulse is detected, the data are retrieved with an appropriate delay (that is, shifted horizontally). The data are then converted back to an analog signal in a digital-to-analog (D/A) converter 50 and the horizontal and vertical sync pulses are reinserted to produce the RS-170 video signal output. This signal, importantly, is substantially identical to the input signal, but with a shift right (delay) or shift left (advance) in the horizontal lines of the raster down to the level 19 (vertically) at which the user selects to have the video information follow the horizontal sync pulse in "real time" orientation. In the illustrated system, by interrogating a computer 32, the data may be read from the computer memory, one word at a time. This provides the user with the intensity profile for the last shifted line.

In the illustrated system 10, the input to the system is provided from a microscope 12 to which is coupled a closed circuit television camera 14. While the illustrated input is from a microscope 12 through camera 14, it is to be understood that other sources such as a telescope/-camera combination, or a camera alone, can provide suitable input signals to the system 10. The image conveyed from microscope 12 through camera 14 to a TV front end 16 is of an object 18 beneath the microscope objective. The image, as seen through the microscope, is illustrated enlarged and in the plane of the drawing at 20. The front end 16 includes a gain and DC level adjust circuit with a clamped output and a sync detector. The gain and level adjust are accomplished illustratively via two RCA CA-3100 wide bandwidth operational amplifiers. The front end incorporates two diodes for level clamping. The signal from the output of the gain and DC level adjust circuit with clamped output is coupled to a LH-0033 current driver so that the signal to A/D converter 22 has a maximum excursion of 0 to −1 volt into a 25 ohm load. The sync detector in the TV front end 16 is a Class C amplifier with input filtering to strip the sync from the incoming composite signal and amplify only the sync pulses. The amplified sync appears on line 24.

The A/D converter 22 illustratively is a TRW TDC-1014J converter. This converter has a band width of 20 MHz and provides six bits of accuracy. In system 10, A/D 22 is clocked at 9.75 MHz to provide 512 pixels per line of incoming video data.

A combination digital shift circuit 30 and computer output circuit 32 is coupled to receive the output of the A/D 22. Upon receipt of a vertical sync pulse on line 24, all address counters of the memory and line counters in digital shift circuit 30 are reset. The first line of data is read into the 512-by-6 bit static RAM at the end of the first horizontal sync pulse. At the end of the next horizontal sync pulse, the address counters are loaded with the amount of shift, which the user supplies to the digital shift circuit 30 through a user-controlled shift amount analog-to-digital converter circuit 34 and a potentiometer 36. Therefore, when the memory is clocked, the data read out of the memory is displaced with respect to its horizontal sync pulse by the user-controlled amount of shift supplied from circuits 34, 36. Since the memory cannot simultaneously be written to and read from, two memory sections are employed. Otherwise, every other line of data would be lost. The two memory sections are run one line out of phase to pick up alternate horizontal lines.

The level 19 at which shifting of the digitized video is reduced to zero is also user-controlled through an A/D converter 40 through a user-controlled shift level circuit. The user adjusts the voltage on the wiper of potentiometer 42 coupled to A/D 40 in the same manner as the voltage on the wiper of potentiometer 36 is controlled. The output potential on this wiper is converted from an analog signal to a digital signal to control the level 19 at which the digital shift circuit 30 reduces the shift in the digitized video to zero. After a given number of lines, determined by the voltage established on the wiper of potentiometer 42, have been written into the two parallel memory sections, the shift is reduced to zero to yield the conventional (non-shifted), but otherwise digitized, video output.

When the computer 32 is requested by a signal on the "data out" line 44, writing into one of the memories is halted. The computer, under control of a 9.75 MHz clock signal on line 46, is then interrogated to divulge its contents into a 6 bit-10 MHz D/A, one pixel at a time. Again, this process limits the output to the D/A converter 50 to every other line. When the computer request "data out" line 44 goes low, the system's operation returns to normal. A digital signal, representative of the amount of shift, is available on a line 47 from the computer output 32. This digital shift-representative signal can be read anytime the system is not supplying data to a video display 52.

Illustratively, a TRW DTC 1016-8 digital-to-analog converter 50 is used to provide an analog output from the unit. After reconversion from digital to analog in D/A converter 50, the sync signal on line 24 is reinserted, and the output signal on line 54 is thus the analog video plus the shift determined by the adjustment of potentiometer 36 down to the level 19 determined by the adjustment of potentiometer 42 plus the remaining video (from level 19 down) unshifted plus the synchronizing signal necessary to display the image with the desired shift to the desired level on display device 52. Brightness and contrast information are directly coupled from the TV front end 16 to the display device 52.

FIG. 2 illustrates the appearance of the display resulting from viewing of object 18 when the shift amount potentiometer 36 is adjusted to provide zero shift, or when the shift level potentiometer 42 is adjusted to provide a shift level above the top of the display 15 or below the bottom of the display 15.

Figure 3:
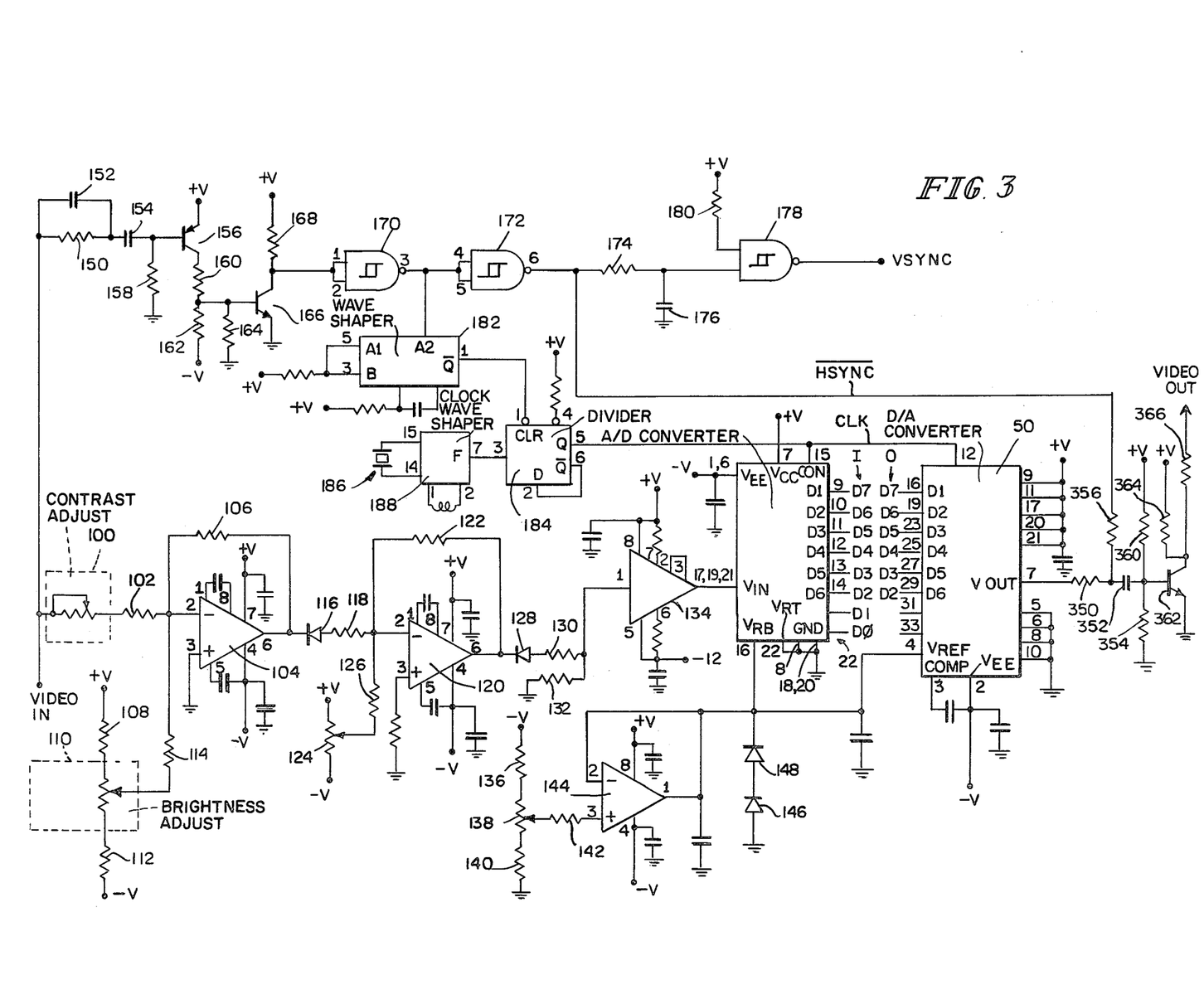
FIG. 3 illustrates, in partly block and partly schematic diagram form, a portion of a circuit realization of the block diagram of FIG. 1.

Turning now to FIG. 3, the incoming video from the camera 14 (FIG. 1) is coupled through a CONTRAST potentiometer 100 and a series resistor 102 to the inverting input terminal, pin 2, of an operational amplifier 104. Amplifier 104 illustratively is a RCA CA3100 amplifier. Feedback is provided from the output terminal, pin 6, of amplifier 104 through a feedback resistor 106 to pin 2. The non-inverting input terminal, pin 3, of amplifier 104 is coupled to ground. A BRIGHTNESS circuit includes a series resistor 108, potentiometer 110, and resistor 112 coupled between +V and −V sources. The sources illustratively are ±12 VDC. The wiper of potentiometer 110 is coupled through a series resistor 114 to pin 2 of amplifier 104.

Pin 6 of amplifier 104 is coupled to the cathode of a diode 116, the anode of which is coupled through a series resistor 118 to the inverting input terminal, pin 2, of another op amp 120. Again, op amp 120 illustratively is an RCA CA3100 operational amplifier. The output terminal, pin 6, of amplifier 120 is coupled through a feedback resistor 122 to pin 2. The wiper of a potentiometer 124 is coupled through a series resistor 126 to pin 2 of amplifier 120. The other terminals of potentiometer 124 are coupled between +V and −V (again illustratively ±12 VDC) sources. The output terminal, pin 6, of amplifier 120 is coupled to the cathode of a diode 128, the anode of which is coupled through series resistors 130, 132 to ground. The junction of resistors 130, 132 is coupled to the non-inverting input terminal, pin 1, of an amplifier 134. The output terminal, pin 4, of amplifier 134 is coupled to the $V_{in}$ terminals 17, 19, 21 of the TRW TDC-1014J A/D converter 22. The six bits of output of A/D converter 22 are provided at pins 14, 13, 12, 11, 10, and 9, respectively, lines DI22-DI7, of A/D converter 22.

$V_{RB}$ voltage is provided to A/D converter 22 from a series resistor string coupled between −V, illustratively −6 VDC, and ground. The string includes resistor 136, potentiometer 138, and resistor 140. The wiper of potentiometer 138 is coupled through a series resistor 142 to the non-inverting input terminal, pin 3, of an operational amplifier 144, which illustratively is a LM1458 op amp. The output terminal, pin 1, of amplifier 144 is coupled directly to its inverting input terminal, pin 2, making the amplifier an inverting amplifier. The output terminal, pin 1, of amplifier 144 is direct coupled to pin 16, the $V_{RB}$ terminal, of A/D converter 22. The potential at pin 16 of A/D 22 is clamped by series diodes 146, 148 between ground and pin 16 of A/D 22. The output terminal, pin 1, of amplifier 144 is also coupled to the $V_{REF}$ terminal, pin 4, of D/A converter 50.

Returning to the video input from camera 14, a sync stripper filter including parallel resistor 150 and capacitor 152 removes the sync from the incoming video and couples it through a capacitor 154 to the base of a transistor 156. The emitter of transistor 156 is coupled to +V (illustratively +12 VDC). The base of transistor 156 is coupled to ground through resistor 158. Its collector is coupled to −V (illustratively, −12 VDC) through series resistors 160, 162. The junction of these resistors is coupled to ground through a resistor 164. The junction of resistors 160, 162 is also coupled to the base of a transistor 166, the emitter of which is coupled to ground and the collector of which is coupled to +V (illustratively +5 VDC) through a resistor 168.

The collector of transistor 166 is coupled to both input terminals, pins 1 and 2, of a hysteresis NAND gate 170. The output terminal, pin 3, of NAND gate 170 is coupled to both input terminals, pins 4 and 5, of a hysteresis NAND gate 172. Inverted horizontal sync ($\overline{HSYNC}$) is available at pin 6 of NAND gate 172. Illustratively, NAND gates 170, 172 are National Semiconductor type 74LS132 gates.

The output terminal, pin 6, of NAND gate 172 is also coupled to a low-pass filter including a resistor 174 and capacitor 176 in series to ground. The junction of resistor 174 and capacitor 176 is coupled to an input terminal, pin 10, of a hysteresis NAND gate 178. An input terminal, pin 9, of gate 178 is coupled through a resistor 180 to a +V source (illustratively +5 VDC). Vertical sync appears at the output terminal, pin 8, of NAND gate 178. Gate 178 illustratively is also a National Semiconductor 74LS132.

Pin 3 of NAND gate 170 is coupled to a terminal $A_2$ (pin 4) of a wave-shaping integrated circuit 182. Illustratively, integrated circuit 182 is a National Semiconductor type 74LS121. The $\overline{Q}$ output terminal, pin 1, of circuit 182 is coupled through an inverter to the CLR input terminal, pin 1, of an integrated circuit 184, which illustratively is a National Semiconductor 74LS7. A 20 MHz crystal oscillator 186 is coupled across input terminals, pins 15, 14, of a clock wave-shaping integrated circuit 188 such as a National Semiconductor 74LS321. The output terminal F (pin 7) of intergrated circuit 188 is coupled to another input terminal, pin 3, of circuit 184. Circuit 184, when coupled in this configuration, divides down the output of the crystal oscillator to 9.75 MHz. The 9.75 MHz clock signal (hereinafter CLK) is provided at pin 15 of A/D 22 and at pin 12 of D/A 50 to clock the input and output of the video data which flows through A/D 22 and D/A 50.

Figure 4:
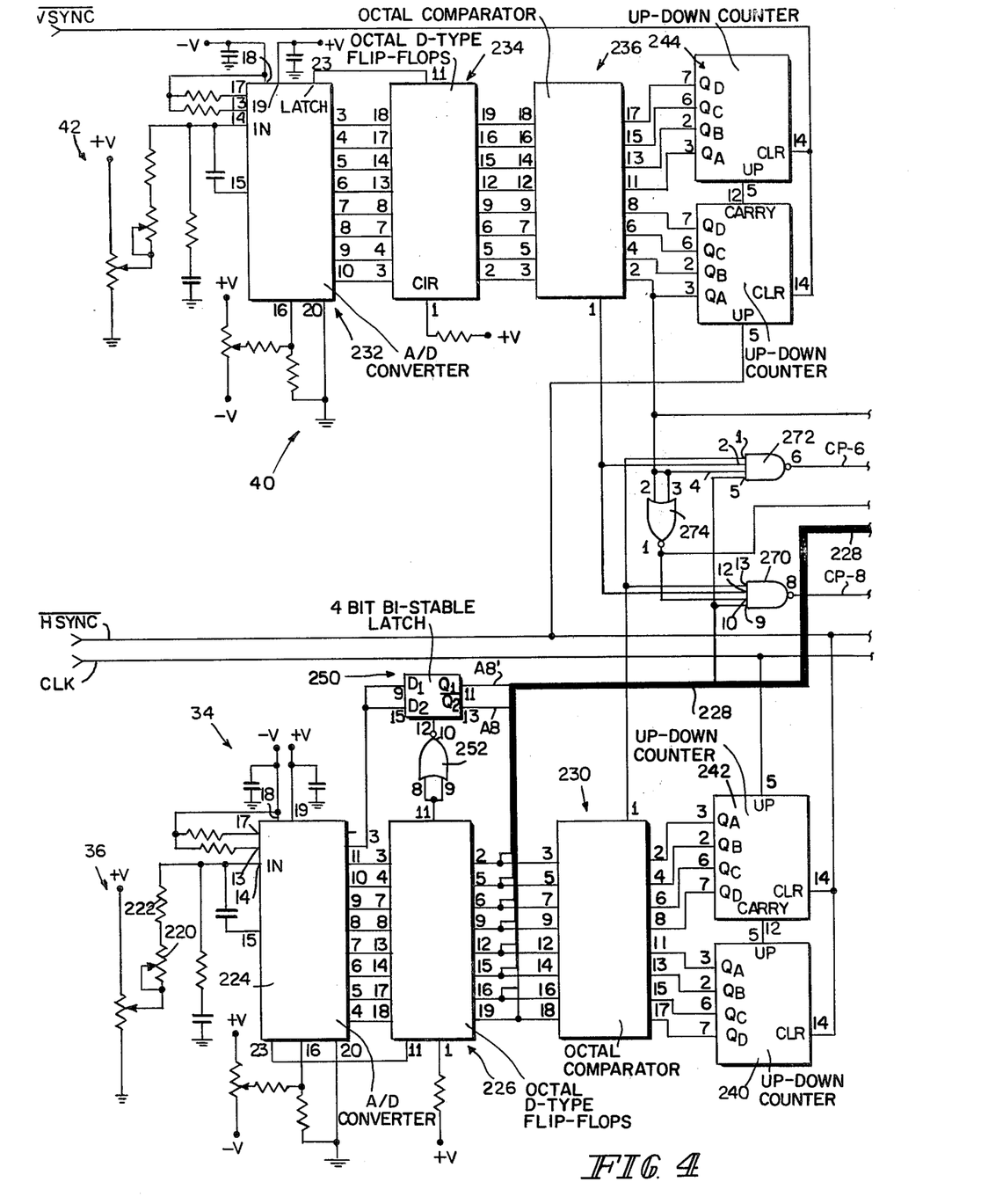
FIG. 4 illustrates, in partly block and partly schematic diagram form, a portion of a circuit realization of the block diagram of FIG. 1.
Figure 5:
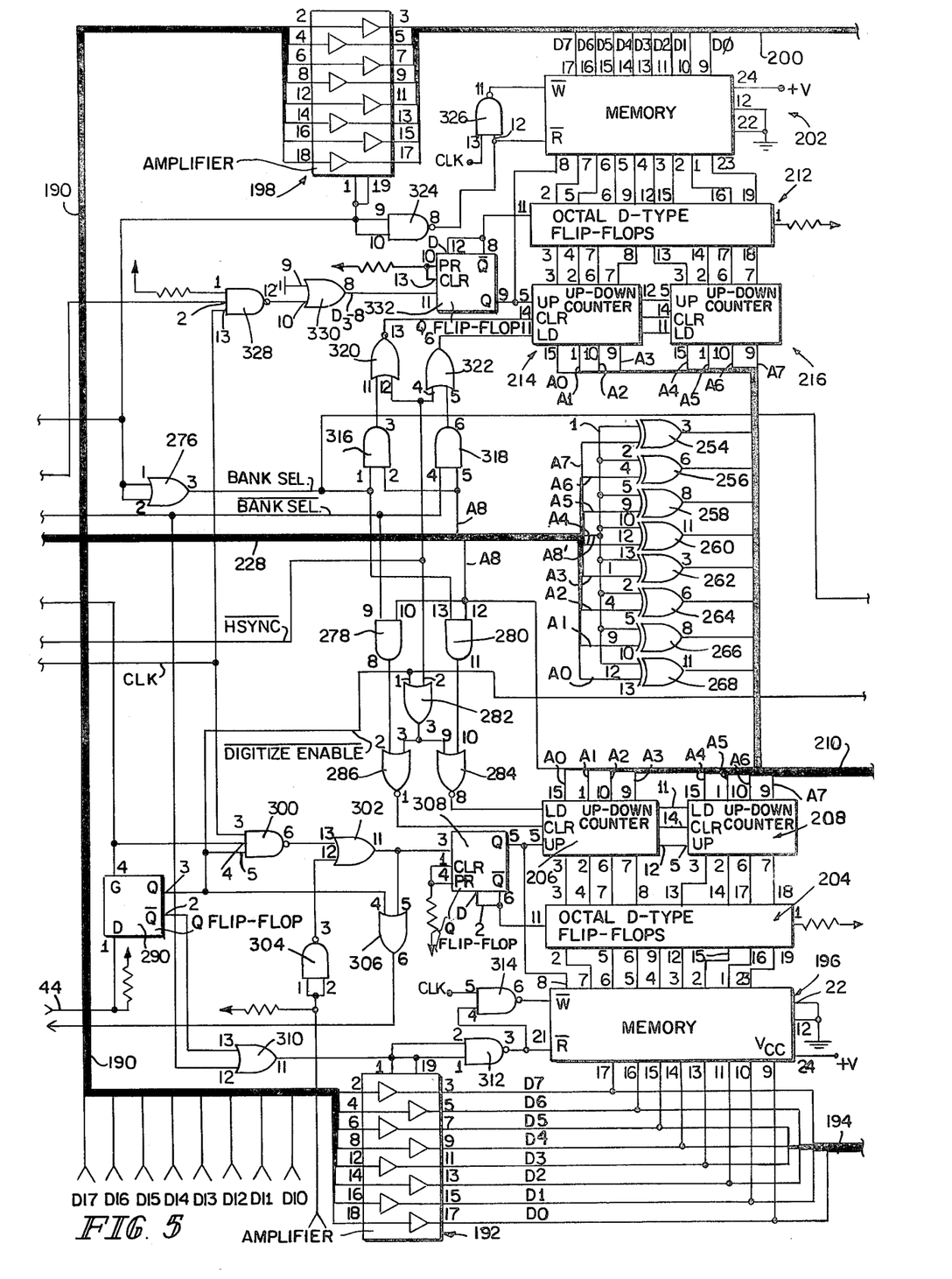
FIG. 5 illustrates, in partly block and partly schematic diagram form, a portion of a circuit realization of the block diagram of FIG. 1.
Figure 6:
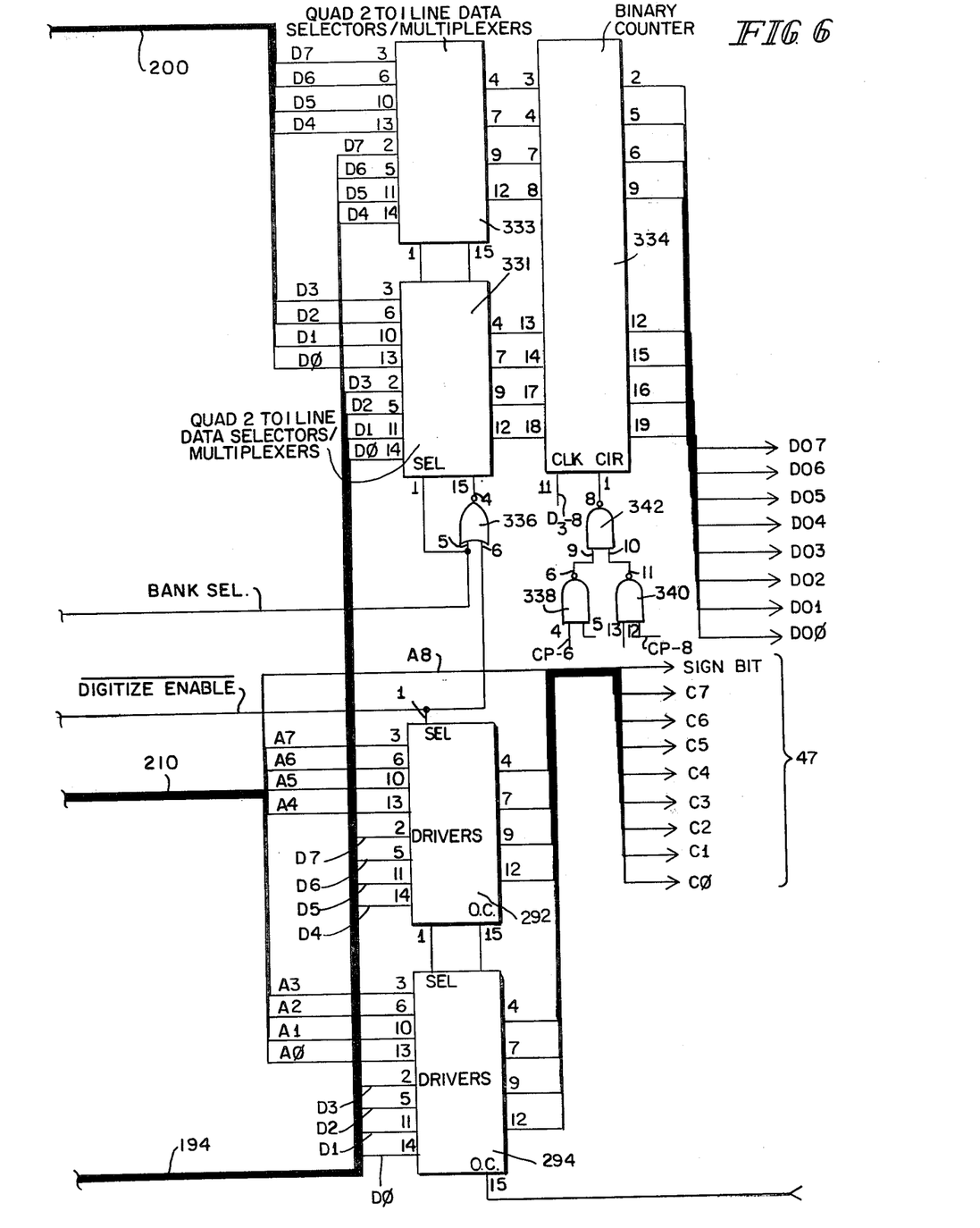
FIG. 6 illustrates, in partly block and partly schematic diagram form, a portion of a circuit realization of the block diagram of FIG. 1.

Turning now to FIGS. 4–6, output lines DI∅–D17 of A/D 22 (FIG. 3) are coupled through an eight-line video data bus 190 to two parallel digital shift circuits (FIG. 5). The first of these circuits includes an eight-input (pins 2, 4, 6, 8, 12, 14, 16, 18), eight-output (pins 3, 5, 7, 9, 11, 13, 15, 17) amplifier integrated circuit 192. Circuit 192 illustratively is a National Semiconductor type DM81LS97 integrated circuit. The outputs at the various output pins of multiple amplifier 192 form a digitized "video out" bus 194. These outputs are also coupled to respective inputs (pins 17, 16, 15, 14, 13, 11, 10, 9, respectively) of a memory section 196. Illustratively, memory section 196 is a Mostek 4801-70 1K × 8 bit memory.

A second identical multiple amplifier circuit 198 including input terminals (pins 2, 4, 6, 8, 12, 14, 16, 18) and output terminals (pins 3, 5, 7, 9, 11, 13, 15, 17) provides digitized video to a digitized "video out" bus 200. The output terminals (pins 3, 5, 7, 9, 11, 13, 15, 17) of amplifier circuit 198 are also coupled to respective input terminals (pins 17, 16, 15, 14, 13, 11, 10, 9, respectively) of a memory section 202 which also illustratively is a Mostek type 4801-70 memory.

Output terminals (pins 7, 6, 5, 4, 3, 2, 1, 23) of memory section 196 are coupled to respective input terminals (pins 2, 5, 6, 9, 12, 15, 16, and 19) of an integrated circuit 204, such as a 74LS273. Output terminals (pins 3, 4, 7, 8) of circuit 204 are coupled to input terminals (pins 3, 2, 6, 7, respectively) of an integrated circuit 206. Output terminal (pins 13, 14, 17, 18, respectively) of circuit 204 are coupled to input terminals (pins 3, 2, 6, 7, respectively) of an integrated circuit 208. Circuits 206, 208, illustratively, are 74LS193 integrated circuits. The output terminals (pins 15, 1, 10, 9) of circuits 206, 208 form lines A∅, A1, A2, A3, A4, A5, A6, A7, respectively, of a delay data bus 210.

In a similar manner, the output terminals (pins 7, 6, 5, 4, 3, 2, 1, 23) of memory section 202 are coupled to input terminals (pins 2, 5, 6, 9, 12, 15, 16, and 19, respectively) of an integrated circuit 212 which illustratively is a 74LS273. Output terminals, pins 3, 4, 7, 8, respectively, of integrated circuit 212 are coupled to pins 3, 2, 6, 7, respectively, of an integrated circuit 214, which illustratively is a 74LS193. Output terminals, pins 13, 14, 17, 18, respectively, of circuit 212 are coupled to pins 3, 2, 6, 7, respectively, of an integrated circuit 216, which illustratively is a type 74LS193 integrated circuit. The output terminals (pins 15, 1, 10, 9) of integrated circuit 214 and pins (15, 1 10, 9) of integrated circuit 216 are coupled, respectively, to the A∅, A1, A2, A3, A4, A5, A6, and A7 lines, respectively, of delay data bus 210.

The "shift amount" signal from potentiometer 36 (FIG. 4) is coupled from the wiper of potentiometer 36 through a gain-adjust potentiometer 220 and a resistor 222 to two inputs, pins 14, 15, of an A/D converter 224 such as the Datel type EK10 ADC. Output terminals (pins 4, 5, 6, 7, 8, 9, 10, 11, respectively) of integrated circuit 224 are coupled to input terminals (pins 18, 17, 14, 13, 8, 7, 4, 3, respectively) of an integrated circuit 226, which illustratively is a type 74LS273. Output terminals 2, 5, 6, 9, 12, 15, 16, 19, respectively, of integrated circuit 226 form conductors A∅–A7 of an eight-conductor delay data bus 228. These terminals are also coupled, respectively, to terminals (pins 3, 5, 7, 9, 12, 14, 16, 18, respectively) of an integrated circuit 230, such as the 74LS685. These circuits, coupled in the illustrated configuration, convert the analog "amount of shift" signal generated on the wiper of potentiometer 36 into a digital signal on the delay data bus 228.

A similar "level of shift" circuit 40, with the input and output terminal pins numbered as illustrated, includes a Datel EK10 ADC 232, a 74LS273 integrated circuit 234, and a 74LS685 integrated circuit 236.

Since the amount of shift on the delay data bus 228 must be re-established on each horizontal line, circuit 34 is clocked by $\overline{HSYNC}$ at the input terminals, pins 14, 14 of two integrated circuits 240, 242. Output terminals 3, 2, 6, 7 of integrated circuit 240 are coupled to terminals 11, 13, 15, 17 of integrated circuit 230. Output terminals 3, 2, 6, 7 of integrated circuit 240 are coupled to terminals 11, 13, 15, 17 of integrated circuit 230. Output terminals 3, 2, 6, 7 of integrated circuit 242 are coupled to input terminals 2, 4, 6, 8, respectively, of integrated circuit 230. Terminals 3, 5, 7, 9, 12, 14, 16, and 18 of integrated circuit 230 are coupled, respectively, to terminals 2, 5, 6, 9, 12, 15, 16, and 19 of integrated circuit 226. The amount of shift information is clocked from circuit 34 by the CLK line which is coupled to pin 5 of circuit 242 and from pin 12 of circuit 242 to pin 5 of circuit 240.

It will also be appreciated that circuit 40 must be reset each vertical field, since circuit 40 controls the distance down from the top of the display, or the level, at which the division of the video display occurs, and this information must be read into the circuit from potentiometer 42 during each vertical field. To that end, the $\overline{VSYNC}$ line is coupled to input terminals, pins 14, 14 of integrated circuits 244, 246. Illustratively, circuits 244, 246 are type 74LS193 integrated circuits. Pin 5 of circuit 244 is coupled to pin 12 of circuit 246, and pin 5 of circuit 246 is coupled to the $\overline{HSYNC}$ line. Pins 3, 2, 6, 7, respectively, of integrated circuit 246 are coupled to pins 2, 4, 6, 8, respectively, of integrated circuit 236 and pins 3, 2, 6, 7 of integrated circuit 244 are coupled, respectively, to pins 11, 13, 15, 17 of integrated circuit 236.

Turning now to the interface between the shift amount circuit 34 and the delay data bus 210, an output terminal, pin 3, of circuit 224 is coupled to input terminals $D_1$, $D_2$ (pins 9, 15, respectively) of an integrated circuit 250, which illustratively is a type 74LS375. An output terminal, pin 11 of circuit 226 is coupled to two input terminals, pins 8, 9, of a NOR gate 252. The output terminal, pin 10, of NOR gate 252 is coupled to the G input terminal, pin 12, of integrated circuit 250. NOR gate 252 illustratively is a type 74LS02.

Output terminal $Q_1$, pin 11, of circuit 250 is coupled to the A8' line of delay data bus 228. The $\overline{Q_2}$ output terminal, pin 13, of circuit 250 is coupled to the A8 line of delay data bus 228. The A8 line of delay data bus 228 is direct-coupled to delay data bus 210.

Referring to FIG. 5, line A8' of delay data bus 228 is coupled to the input terminals, pins 1, 4, 9, 12, 1, 4, 9, 12, of eight EXCLUSIVE OR (hereinafter EX OR) gates 254, 256, 258, 260, 262, 264, 266, 268). Gates 254, 256, 258, 260 illustratively are one type 74LS86 integrated circuit. Gates 262, 264, 266, 268 illustratively are another type 74LS86 integrated circuit. There are four such EX OR gates on each of these type 74LS86 chips. The A∅ line of delay data bus 228 is coupled to the input terminal, pin 13, of EX OR gate 268. The A1 line of delay data bus 228 is coupled to pin 10 of EX OR gate 266. The A2 line of delay data bus 228 is coupled to an input terminal, pin 5, of gate 264. The A3 line of delay data bus 228 is coupled to pin 2 of EX OR gate 262. The A4 line of bus 228 is coupled to pin 13 of EX OR gate 260. The A5 line of bus 228 is coupled to pin 10 of EX OR gate 258. The A6 line of bus 228 is coupled to pin 5 of gate 256. The A7 line of bus 228 is coupled to pin 2 of EX OR gate 254.

The output terminal, pin 3, of EX OR gate 254 is coupled to line A7 of delay data bus 210. The output terminal, pin 6, of EX OR gate 256 is coupled to line A6 of bus 210. The output terminal, pin 8, of EX OR gate 258 is coupled to the A5 line of bus 210. The output terminal, pin 11, of gate 260 is coupled to the A4 line of bus 210. The output terminal, pin 3, of gate 262 is coupled to the A3 line of bus 210. The output terminal, pin 6, of gate 264 is coupled to the A2 line of bus 210. The output terminal, pin 8, of gate 266 is coupled to the A1 line of bus 210, and the output terminal, pin 11, of gate 268 is coupled to the A∅ line of bus 210.

In FIG. 4, the A8 line of delay data bus 228 is also coupled to input terminals, pins 9 and 5, of two NAND gates 270, 272. NAND gates 270, 272 illustratively are type 74LS20 gates. The $\overline{P>Q}$ output terminal, pin 1, of circuit 236 is coupled to an input terminal, pin 2, of gate 272 and an input terminal, pin 12, of gate 270. Pin 2 of circuit 236 is coupled to an input terminal, pin 4, of gate 272 and to two input terminals, pins 2, 3, of a NOR gate 274, which illustratively is a type 74LS02 gate. The output terminal, pin 1, of NOR gate 274 is coupled to an input terminal, pin 10, of NAND gate 270. The $\overline{P>Q}$ terminal, pin 1, of circuit 230 is coupled to an input terminal, pin 1, of NAND gate 272 and to an input terminal, pin 13, of NAND gate 270. Pin 2 of circuit 236 is also coupled to both input terminals, pins 1, 2, of an OR gate 276, which illustratively is a type 74LS32 gate (FIG. 5).

The outputs provided at the output terminals, pin 1, pin 3, respectively, of NOR gate 274 (FIG. 4) and OR gate 276 (FIG. 5) are the $\overline{BANKSELECT/}$ line and the BANK SELECT line, which condition circuits 196, 202 alternately to store digitized video information or to be interrogated to read out onto delay data bus 210 shifted digitized video information. Further processing of these signals for supply to circuits 196, 204, 206, 208 is achieved by AND gates 278, 280, OR gates 282, 284, and NOR gate 286. The BANK SELECT line is coupled to an input terminal, pin 13, of AND gate 280. The A8 line of delay data bus 228 is coupled to an input terminal, pin 12, of AND gate 280. Illustratively, gate 280 is a type 74LS08 gate, as is gate 278. The A8 line of delay data bus 228 is coupled to an input terminal, pin 10, of AND gate 278. The $\overline{BANKSELECT/}$ line is coupled to an input terminal, pin 9, of AND gate 278. The $\overline{HSYNC}$ line is coupled to an input terminal, pin 2, of OR gate 282. The output terminal of OR gate 282, pin 3, is coupled to input terminals, pins 3 and 9, respectively, of NOR gate 286 and OR gate 284. The output terminals, pins 1 and 8, respectively, of NOR gate 286 and OR gate 284 are coupled to the CLR terminal, pin 14, and the LD terminal, pin 11, of circuit 206.

The output terminal, pin 8, of NAND gate 270 (FIG. 4) is coupled to the G input terminal, pin 4, of a Q flip-flop 290 (FIG. 5). The D input terminal, pin 1, of circuit 290 is coupled to the $\overline{DIGITIZEDREQUEST/}$ line, or DATA OUT line 44 (see FIG. 1). The Q output, pin 3, of circuit 290 is the $\overline{DIGITIZEENABLE/}$ line. This line is coupled to an input terminal, pin 1, of OR gate 282, and to the SELECT terminal, pin 1, of a video display driver integrated circuit 292 (FIG. 6). An output terminal, pin 2, of integrated circuit 292 is coupled to the SELECT input terminal, pin 1, of an integrated circuit 294. Integrated circuits 292, 294 illustratively are both type 74LS257 integrated circuits, and are the drivers for the digital signal representative of the amount of shift, which is available on the bus 47 whenever the system is not supplying data to a video display 52 (see FIG. 1). An OUTPUTENABLE/ signal is provided to an input terminal, pin 15, of each of circuits 292, 294. Pins 14, 11, 5, 2 of integrated circuit 294 and pins 14, 11, 5, 2 of integrated circuit 292, respectively, are coupled to the D0–D7 lines of video out bus 194. Pins 13, 10, 6, 3 of integrated circuit 294 and pins 13, 10, 6, 3 of integrated circuit 292 are coupled, respectively, to the lines A0–A7 of delay data bus 210. Line A8 of delay data bus 210 is direct-coupled to the sign bit of bus 47.

In FIG. 5, the Q output of circuit 290 is coupled to an input terminal, pin 5, of a NAND gate 300. Another input terminal, pin 4, of NAND gate 300 is coupled to the G terminal, pin 4, of circuit 290. A third input terminal, pin 3, of NAND gate 300 is coupled to the CLK line. Gate 300 illustratively is a type 74LS10 NAND gate. The output terminal, pin 6, of gate 300 is coupled to an input terminal, pin 13, of an OR gate 302. A $\overline{\text{COMPUTERCLOCK}}$/ line is coupled to both input terminals, pins 1, 2, of a NAND gate 304, the output terminal, pin 3, of which is coupled to pin 12 of OR gate 302. NAND gate 304 illustrative is a type 74LS00 gate. The output terminal, pin 11, of OR gate 302 is coupled to an input terminal, pin 5, of an OR gate 306. The Q line, pin 3, of circuit 290 is coupled to an input terminal, pin 4, of OR gate 306. The output terminal, pin 6, of OR gate 306 forms the DATA VALID indicator line of the system. The output, pin 11, of OR gate 302 is also coupled to an input terminal, pin 3, of a Q flip-flop 308. The Q output terminal, pin 5, of circuit 308 is coupled to the UP input terminal, pin 5, of circuit 206. The CARRY output terminal, pin 12, of circuit 206 is coupled to the UP input terminal, pin 5, of circuit 208. The Q output terminal of circuit 308 is also coupled to pin 8 of memory circuit 196. The D and $\overline{Q}$ terminals, pins 2, 6, respectively, of circuit 308 are joined and are coupled to an input terminal, pin 11, of circuit 204.

The $\overline{Q}$ output terminal, pin 2, of circuit 290 is coupled to an input terminal, pin 13, of an OR gate 310. Another input terminal, pin 12, of OR gate 310 is coupled to the output terminal, pin 1, of NOR gate 274 (FIG. 4). The output terminal, pin 11, of OR gate 310 is coupled to input terminals $\overline{G}_1$ and $\overline{G}_2$, pins 1, 19, respectively, of amplifier chip 192. Pin 11 of OR gate 310 is also coupled to both input terminals, pins 1, 2, of a NAND gate 312, the output terminal, pin 3, of which is coupled to the $\overline{\text{READ}}$ input terminal, pin 21, of memory 196. Pin 3 of NAND gate 312 is also coupled to an input terminal, pin 4, of a NAND gate 314. Another input terminal, pin 5, of NAND gate 314 is coupled to the CLK line. The output terminal, pin 6, of NAND gate 314 is coupled to the $\overline{\text{WRITE}}$ input terminal of memory circuit 196. OR gate 310 illustratively is a type 74LS32 OR gate. NAND gates 312, 314 illustratively are type 74LS00 NAND gates.

The BANK SELECT and $\overline{\text{BANKSELECT}}$/ lines are also coupled, respectively, to an input terminal, pin 1, of an AND gate 316 and an input terminal, pin 4, of an AND gate 318. Additional input terminals, pins 2, 5 of AND gates 316, 318, respectively, are coupled to the A8 line of delay data bus 228. The output terminals, pins 3, 6, respectively, of AND gates 316, 318 are coupled, respectively, to an input terminal, pin 11, of a NOR gate 320 and an input terminal, pin 5, of an OR gate 322. Input terminals, pins 12, 4, respectively, of NOR gate 320 and OR gate 322, are coupled together and are joined to the $\overline{\text{HSYNC}}$ line. The output terminal, pin 13, of NOR gate 320 is coupled to the CLR input terminal, pin 14 of circuit 214. The output terminal, pin 6, of OR gate 322 is coupled to the LD input terminal, pin 11, of circuit 214. AND gates 316, 318 illustratively are type 74LS08 AND gates. NOR gate 320 illustratively is a type 74LS02 NOR gate and OR gate 322 illustratively is a type 74LS32 OR gate.

Pin 2 of circuit 236 (FIG. 4) is coupled to the $G_1$ and $G_2$ input terminals, pins 1, 19, respectively, of amplifier circuit 198 (FIG. 5). Pin 2 of circuit 236 is also coupled to both input terminals, pins 9, 10 of a NAND gate 324. The output terminal, pin 8, of NAND gate 324 is coupled to an input terminal, pin 12, of a NAND gate 326, and to the $\overline{\text{READ}}$ input terminal of memory circuit 202. Another input terminal, pin 13, of NAND gate 326 is coupled to the CLK line. The output terminal, pin 11, of NAND gate 326 is coupled to the $\overline{\text{WRITE}}$ input terminal of memory circuit 202. NAND gates 324, 326, illustratively, are type 74LS00 NAND gates.

The output terminal, pin 6, of NAND gate 272 (FIG. 4) is coupled to an input terminal, pin 2, of a NAND gate 328 (FIG. 5). An input terminal, pin 13, of NAND gate 328 is coupled to the CLK line. The output terminal, pin 12, of NAND gate 328 is coupled to an input terminal, pin 10, of an OR gate 330. Another input terminal, pin 9, of OR gate 330 is coupled to ground. The output terminal, pin 8, of OR gate 330 is coupled to an input terminal, pin 11, of a Q flip-flop 332. The Q output terminal, pin 9, of circuit 332 is coupled to the UP input terminal, pin 5, of circuit 214. The CARRY output terminal, pin 12, of circuit 214 is coupled to the UP input terminal, pin 5, of circuit 216. The Q output terminal, pin 9, of circuit 332 is also coupled to pin 8 of memory circuit 202. The $\overline{Q}$ and D terminals, pins 8, 12, respectively, of circuit 332 are coupled to an input terminal, pin 11, of circuit 212. Circuit 328 illustratively is a type 74LS10 NAND gate. OR gate 330 illustratively is a type 74LS32 OR gate. Flip-flop 332 illustratively is a type 74LS74 integrated circuit.

In FIG. 6, the video out bus 194 lines D0–D7 are coupled, respectively, to the pins 14, 11, 5, 2, 14, 11, 5, 2 of two integrated circuits 331, 333. Circuits 331, 333 illustratively are type 74LS157 integrated circuits. The video out bus 200 lines D0–D7 are coupled respectively to pins 13, 10, 6, 3 of circuit 331 and pins 13, 10, 6, 3 of circuit 333. The output terminals, pins 12, 9, 7, 4 of circuit 331 and pins 12, 9, 7, 4 of circuit 333 are coupled, respectively, to input terminals, pins 18, 17, 14, 13, 8, 7, 4, 3 of a circuit 334 which is illustratively a type 74LS293 integrated circuit. The digitized video output lines D00–D07 are coupled to terminals 19, 16, 15, 12, 9, 6, 5, 2, respectively, of circuit 334.

The BANK SELECT line is coupled to the SEL input terminal, pin 1, of circuit 331 and to an input terminal, pin 5, of a NOR gate 336. Another input terminal, pin 6, of NOR gate 336 is coupled to the $\overline{\text{DIGITIZEENABLE}}$/ line. The output terminal, pin 4, of NOR gate 336 is coupled to pin 15 of circuit 331. Illustratively, gate 336 is a type 74LS02 NOR gate.

Three additional NAND gates 338, 340, 342 are provided. An input terminal, pin 4, of NAND gate 338 is coupled to line CP-6. An input terminal, pin 5, of NAND gate 338 is coupled to the $\overline{\text{BANKSELECT}}$/ line. An input terminal, pin 13, of NAND gate 340 is coupled to the BANK SELECT. An input terminal, pin 12, of NAND gate 340 is coupled to the CP-8 line. The output terminals, pins 6 and 11, respectively, of NAND gates 338, 340 are coupled to input terminals, pins 9 and 10, respectively, of NAND gate 342. The output terminal, pin 8, of NAND gate 342 is coupled to the CLR input terminal, pin 1, of circuit 334. The CLK input terminal, pin 11, of circuit 334 is coupled to lines D3–D8. NAND gates 338, 340, 342 illustratively are type 74LS00 NAND gates.

Returning now to FIG. 3, the D02-D07 lines from circuit 334 (FIG. 6) are coupled, respectively, to the input terminals 29, 27, 25, 23, 19, 16 of D/A converter 50. Input terminals, pins 9, 11, 17, 20, 21 of D/A 50 are all coupled to +V, illustratively, +5 VDC. Pins 5, 6, 8, 10 of D/A 50 are coupled to ground. Pin 7 of D/A 50 is coupled through a resistor 350, a capacitor 352, and a resistor 354 to ground. $\overline{\text{HSYNC}}$ from the output terminal, pin 6, of hysteresis NAND gate 172 is inserted through a series resistor 356 between resistor 350 and capacitor 352. +V, illustratively, +5 VDC is coupled through a resistor 360 to the base electrode of a transistor 362. The base-emitter junction of transistor 362 is coupled in parallel with resistor 354. The collector of transistor 362 is coupled through a series resistor 364 to +V, illustratively, +5 VDC. The collector of transistor 362 is coupled through a resistor 366 to provide the reconstructed RS-170 signal which provides the display 15 (FIG. 1).

What is claimed is:

1. An apparatus for splitting an image comprising means for receiving a video image signal, means for digitizing the video image signal, means for coupling the receiving means to the digitizing means, means for shifting a first portion of the digitized image signal relative to a second portion of the digitized image signal to split the image, and means for coupling the digitizing means to the shift means.

2. The apparatus of claim 1 wherein said shift means includes means for controlling the amount and selecting the direction the first portion is shifted relative to the second portion.

3. The apparatus of claim 1 wherein the shift means comprises means for digitally shifting the first portion relative to the second portion.

4. The apparatus of claim 3 wherein said shift means comprises a shift register.

5. The apparatus of claim 1 and further comprising means for decoding said digitized split image signal to generate an analog video split image signal, and means for coupling said shift means to the decoding means.

6. The apparatus of claim 5 wherein said receiving means further includes means for extracting from said video image signal information necessary to synchronize a display of the image, said digitizing means including means for digitizing only the image portion of the video image signal, and said shift means includes means to shift only said first portion relative to the synchronizing information.

7. The apparatus of claim 6 wherein said shift means further comprises means for controlling the amount and selecting the direction the first portion is shifted relative to the synchronizing information.

8. The apparatus of claim 6 and further comprising means for decoding said digitized split image signal to generate an analog split image signal and means for combining the analog split image signal with said synchronizing information to produce an analog video split image signal.

9. The apparatus of claim 6 wherein said video image signal comprises a plurality of fields, each field including a plurality of lines, a line synchronization pulse associated with each line and a field synchronization pulse associated with each field, said extraction means extracting the synchronization information the form of the line and field synchronization pulses from said video image signal, said digitizing means successively digitizing each line, and said shift means shifting at least one of the digitized lines relative to its associated line synchronization pulse.

10. The apparatus of claim 9 wherein said digitizing means comprises first and second memories and said shift means includes means for alternately reading the first and second memories to obtain the digitized line upon which the shift means operates.

11. The apparatus of claim 9 wherein said shift means further comprises selection means for controllably selecting a number of successively occurring digitized lines to be shifted relative to their associated line synchronization pulses.

12. The apparatus of claim 11 and further including means for comparing the digitized unshifted line immediately succeeding the last digitized shifted line in the field to the last digitized shifted line in the field to produce an intensity profile of the split image along the split and means coupling the comparing means to the shift means.

13. The apparatus of claim 11 wherein the selection means further includes means for determining the beginning of the next field and shifting the selected number of digitized lines occurring after the beginning of the next field relative to their associated line synchronization pulses.

14. The apparatus of claim 13 wherein said selection means further includes a potentiometer, an analog-to-digital converter, and a voltage source, means for coupling the potentiometer to the voltage source, means for coupling the potentiometer to the analog-to-digital converter, said shift means including means for responding to a digitized signal from the analog-to-digital converter to controllably select said number.

15. The apparatus of claim 11 wherein the selection means further includes means for determining the beginning of the next field and shifting the selected number of digitized lines occurring after the beginning of the next field relative to their associated line synchronization pulses.

16. The apparatus of claim 15 wherein said shift means further includes control and selection means for controlling the amount and selecting the direction that each digitized line is shifted relative to its associated line synchronization pulse.

17. The apparatus of claim 16 wherein said decoding means includes means for decoding each digitized shifted and unshifted line to reconstitute an analog line for each digitized line, and combining means for combining the reconstituted analog lines with appropriate line and field synchronization pulses to produce a split image video signal.

18. The apparatus of claim 16 wherein said control means comprises a potentiometer and an analog-to-digital converter, means for coupling the potentiometer to the analog-to-digital converter, said shift means including means for responding to an output signal from the analog-to-digital converter to control the amount and select the direction the first portion is shifted relative to the second portion.

19. An apparatus for splitting an image comprising means for receiving a video image signal having a plurality of fields, each field comprising a plurality of lines, each line having an associated line synchronization pulse, each field having an associated field synchronization pulse; means for separating the lines from the field and line synchronization pulses; the separation means having a line output and a synchronization pulse output; means for coupling the receiving means to the separation means; means for digitizing each line; means for coupling the separation means' line output to the digitizing means; means for shifting one of the digitized lines in each field relative to its associated line synchronization pulse; means for coupling the digitizing means to the shift means; and means for coupling the synchronization output of the separation means to the shift means.

20. The apparatus of claim 19 and further comprising means for decoding each digitized shifted and unshifted line from the shift means to produce corresponding analog shifted and unshifted lines, means for coupling the shift means to the decoding means, means for combining the analog shifted and unshifted lines with the line and field synchronization pulses to generate a video split image signal, means for coupling the decoding means to the combining means, and means for coupling the separation means' synchronization output to the combining means.

* * * * *